United States Patent
Moreau et al.

(10) Patent No.: US 12,473,098 B2
(45) Date of Patent: Nov. 18, 2025

(54) SYSTEM FOR MONITORING A MOVABLE SURFACE OF AN AIRCRAFT

(71) Applicant: SAFRAN ELECTRONICS & DEFENSE, Paris (FR)

(72) Inventors: Paul Moreau, Moissy-Cramayel (FR); Julien Hautecoeur, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 148 days.

(21) Appl. No.: 18/515,770

(22) Filed: Nov. 21, 2023

(65) Prior Publication Data
US 2024/0166364 A1 May 23, 2024

(30) Foreign Application Priority Data
Nov. 21, 2022 (FR) .................................. 2212084

(51) Int. Cl.
*B64D 45/00* (2006.01)
*B64F 5/60* (2017.01)
*B64C 9/00* (2006.01)

(52) U.S. Cl.
CPC ............ *B64D 45/00* (2013.01); *B64F 5/60* (2017.01); *B64C 9/00* (2013.01); *B64D 2045/0085* (2013.01)

(58) Field of Classification Search
CPC ........... B64D 45/00; B64D 2045/0085; B64D 45/0005; B64D 2045/001; B64F 5/60; B64C 9/00; B64C 13/38
(Continued)

(56) References Cited

U.S. PATENT DOCUMENTS 8,583,293 B2 * 11/2013 Soronda ................ B64C 13/503
  244/99.2
9,108,724 B2 * 8/2015 Rechsiek ........... B64D 45/0005
(Continued)

FOREIGN PATENT DOCUMENTS

DE   10 2017 002053 A1   9/2017
FR       2 983 456 A1   6/2013

OTHER PUBLICATIONS

Search Report as issued in French Patent Application No. FR2212084, dated Jun. 1, 2023.

*Primary Examiner* — Muhammad Shafi
(74) *Attorney, Agent, or Firm* — Pillsbury Winthrop Shaw Pittman LLP

(57) ABSTRACT

A monitoring system includes a movable surface of an aircraft, an actuation system for the movable surface of an aircraft including actuators, a first position sensor adapted to measure a position of a first actuator of the actuators and a second position sensor adapted to measure a position of a second actuator of the actuators. The monitoring system also includes a first force sensor adapted to measure forces passing through the first actuator of the actuators and a second force sensor of the at least two force sensors being adapted to measure forces passing through the second actuator of the actuators. The monitoring system also includes a calculator configured to detect skew of the movable surface and excess force passing through the first and/or second actuator from the position obtained by the at least two position sensors and the force measured by the at least two force sensors.

8 Claims, 5 Drawing Sheets

(58) Field of Classification Search
USPC .......................................................... 701/29.2
See application file for complete search history.

(56) References Cited

U.S. PATENT DOCUMENTS

| | | | |
|---|---|---|---|
| 9,573,676 B2 * | 2/2017 | Dyckrup | B64C 9/16 |
| 10,017,273 B2 | 7/2018 | Jones | |
| 10,301,038 B2 | 5/2019 | Teubner | |
| 2007/0145180 A1 * | 6/2007 | Johnson | B64C 13/50 |
| | | | 244/13 |
| 2010/0100355 A1 | 4/2010 | Marx et al. | |
| 2013/0009017 A1 * | 1/2013 | Thompson | B64C 13/505 |
| | | | 244/213 |
| 2017/0305530 A1 * | 10/2017 | Finn | B64C 13/02 |

\* cited by examiner

SYSTEM FOR MONITORING A MOVABLE SURFACE OF AN AIRCRAFT

CROSS-REFERENCE TO RELATED APPLICATIONS

This application claims priority to French Patent Application No. 2212084, filed Nov. 21, 2022, the entire content of which is incorporated herein by reference in its entirety.

FIELD

The technical field of the invention is that of systems for monitoring movable surfaces of an aircraft.

The present invention relates to a system for monitoring a movable surface of an aircraft and a method for monitoring a movable surface of an aircraft.

BACKGROUND

Movable surfaces of an aircraft are mechanical parts whose tilt and position relative to another reference part of the aircraft may vary. FIG. 1 schematically shows a system 100 comprising a movable surface 101 and a mechanical reference part 102. FIG. 2 schematically shows the same movable surface 101 with a value of tilt relative to the mechanical reference part 102 different from the value of tilt relative to the mechanical reference part 102 shown in FIG. 1. For the sake of simplicity, the terms "surface tilt" will now be used to describe tilt of a movable surface relative to a reference part of the aircraft.

Tilt of a surface is modified by an actuation system comprising one or more actuators. Thus, as shown in FIGS. 1 and 2, an actuator 103 enables tilt of the surface 201 to be modified by performing a movement. The actuator 103 is fastened to the mechanical reference part 102 through a fastener 106 and to the movable surface 101 through a fastener 107. The movable surface 101 is fastened to the mechanical reference part 102 through a fastener 105. Tilt of the surface is also commonly referred to as the position of the surface. This is because the position of the edge of the surface opposite to the edge of the surface fastened to the aircraft is modified when the tilt of the movable surface changes. It should be noted that the position is relative to a reference part of the aircraft. For example, in FIGS. 1 and 2, the position of the edge 104 of the surface 101 has been modified relative to the mechanical reference part 102. For the sake of simplicity, the terms "surface position" will now be used to describe position of the movable surface relative to another reference part of the aircraft.

Examples of movable surfaces are the flaps of an aeroplane wing, the leading edge slats or the spoilers of an aeroplane wing.

When a surface is movable by means of at least two actuators, there is a risk of skew of the movable surface. Skew of a movable surface can also consist of warping of the movable surface. If this skew is too great, it can damage the structure of the aircraft, especially the actuation system of the movable surface, and thus compromise its mission. It is therefore important to be able to monitor movable surfaces, especially in order to detect skew of a movable surface.

Current systems for monitoring movable surfaces are based on measurements of the position of said surface. It should be noted that such monitoring systems have to be capable of measuring the tilt of the surface relative to a mechanical reference part of the aircraft, such as the frame of an aeroplane wing within the scope of monitoring an aeroplane wing flap. Indeed, measuring the tilt of the surface relative to a reference part enables skew of the surface to be detected. Monitoring the position of the actuator alone is not sufficient, as it would not be possible, for example, to detect any skew of the tiltable surface as a result of mechanical breakage between the actuator and the tiltable surface.

Monitoring systems are currently implemented using "wired" sensor-based systems or hinged mechanical systems.

When a "wired" sensor-based system is used, the metal cable of each sensor connects the movable surface to the mechanical reference part. Thus, when the movable surface is tilted, the cables are unwound (or wound) and hence each rotatably drives an axis. A rotary sensor per cable can then be used to deduce tilt of the movable surface therefrom.

In the case of a hinged mechanical system, the sensor is no longer driven via a cable but via a connecting rod or crank system connected to the movable surface.

Skew of a movable surface is therefore detected by such systems when a difference in position is measured between the different sensors of said surface.

An example of a system comprising movable surfaces, an actuation system of the movable surfaces and a system for monitoring the movable surfaces is shown in FIG. 3: a power generator 3 generates a torque via an electric or hydraulic motor, controlled by a calculator. The torque is then transmitted to the actuators 4a and 4b of the movable surfaces 10 and 11, represented here by ball screws, through mechanical transmission elements 5. The position of the movable surfaces 10 and 11 is measured by position sensors 1. The two ball screws 4a, b then convert the torque into translation and transmit this translation to the two movable surfaces 10 and 11.

The four position sensors 1 of the monitoring system therefore enable the position of the surfaces 10 and 11 to be monitored.

Skew of a movable surface can happen in two cases:
Damage to a mechanical transmission element; or
Damage to an actuator or to the fastener of the actuator to the movable surface.

FIG. 4 illustrates damage 20 to a mechanical transmission element 5 and FIG. 5 illustrates damage 21 to an actuator 4b or to the fastener of an actuator 4b with the movable surface 10. These two types of damage will generate skew of the movable surface 10. This skew will be detected since a difference in position will be measured using the two sensors 1 of the movable surface 10.

When skew of a movable surface is detected, stopping the actuation system is performed. This stopping may consist in immobilizing the actuators or modifying position of the surface for reducing the force passing through the actuators of said surface.

However, current systems comprising a monitoring system implemented via "wired" sensor-based systems or by hinged mechanical systems have several problems.

A first problem with such systems is the difficulty of ensuring accurate detection of the skew of a movable surface of an aircraft whatever the operating temperature of the system. Indeed, monitoring systems, which are based on measuring the position of the movable surface in order to detect skew of the surface, are unable to measure position of the surface accurately whatever the operating temperature of the system. Indeed, once the movable surface is deployed, thermal expansion and/or contraction can lead to parasitic rotation of the sensors, thereby degrading measurement accuracy. Furthermore, when the distances to be measured between the reference part and the movable surface are large, accuracy of the measurement varies even more as a function of the operating temperatures of the system.

A second problem with current monitoring systems is their sensitivity to environmental pollution. Indeed, the sensors in such systems are exposed to external air flow, especially upon extension of the monitored movable surface. An example of such an extension of a tilting surface 201 is shown in FIG. 2.

In the case of monitoring systems of the connecting rod or crank type, two other problems arise. Firstly, these systems are bulky and can therefore lead to severe integration restrictions given the generally very limited space under the movable surface, for example between the wing frame and the flap. In addition, these systems are heavy and include a large number of mechanical elements to be considered in the transmission chain.

Furthermore, it is important to ensure integrity of the actuation system, and in particular of the actuators, by limiting the force passing through said actuators. It is currently common practice to use a mechanical torque limiter such as a ball-type torque limiter to limit the force passing through said actuators. FIG. 3 schematically shows ball-type torque limiters 2a and 2b. Thus, the element 3 generates torque. This torque is transmitted to the mechanical transmission elements 5 and to the torque limiters 2a. The torque is then transmitted to the first actuators 4a. Finally, the torque is subsequently transmitted via the mechanical transmission elements 5 to the second torque limiters 2b and to the external actuators 4b.

These mechanical torque limiters, especially ball-type torque limiters, have a number of drawbacks, such as their sensitivity to vibratory conditions, the risk of accidental triggering and the difficulty of guaranteeing constant accuracy throughout the operating temperature range of such a system. In addition, these torque limiters run the risk of integrating undetected failures into the actuation system. An undetected failure is a failure which is not detected when it occurs and which has no impact on the operation of the aircraft if it occurs alone. For example, in the case of the torque limiters 2a and 2b of FIG. 3, a failure of a torque limiter could be detected only if there is a need to limit the torque, namely possibly long after the failure at the torque limiter and therefore the absence of limitation by the torque limiter.

Aspects of the invention therefore aim to provide a system ensuring integrity of the actuation system which does not have the drawbacks previously recited.

SUMMARY

Various aspects of the invention offer a solution to the problems discussed above, by allowing reliable detection of skew of the movable surface and of an excess force passing through one or more of the actuators of the movable surface.

An aspect of the invention relates to a monitoring system comprising:
- a movable surface of an aircraft;
- an actuation system for the movable surface of the aircraft comprising actuators;
- at least two position sensors per movable surface of the aircraft, a first position sensor of the at least two position sensors being adapted to measure a position of a first actuator of the actuators and a second position sensor of the at least two position sensors being adapted to measure a position of a second actuator of the actuators;
- at least two force sensors per movable surface of the aircraft, a first force sensor of the at least two force sensors being adapted to measure forces passing through the first actuator of the actuators, and a second force sensor of the at least two force sensors being adapted to measure forces passing through the second actuator of the actuators; and
- a calculator configured to detect skew of the movable surface and an excess force passing through the first and/or second actuator from the position obtained by the at least two position sensors and the force measured by the at least two force sensors.

This monitoring system enables reliable detection of skew of the movable surface or of an excess force passing through one of the actuators of the movable surface. This monitoring system has the benefit, in particular, of using position sensors which measure position of an actuator and not position of the movable surface. As a result, the position sensor has a simplified architecture because it has no direct link with the movable surface. Position sensors compatible with various aspects of the invention only require a direct connection to an actuator or a simple reducer to fasten it to an actuator. In addition, the position sensor for measuring the position of the actuator can be located so as to be less subject to environmental stress than a position sensor measuring the position of a movable surface.

Position sensors used in the monitoring system according to an embodiment of the invention measure displacements of the actuators and therefore make it possible to detect cases of skew of a movable surface when one or more actuators of the actuation system exert thrust that is unequal to thrusts of the other actuators of the actuation system. They also make it possible to detect skew of a movable surface in the event of a problem related to the operation of the aircraft such as, for example, a mechanical transmission breakage, as illustrated in FIG. 4, or seizure at a slide or hinge or at an actuator.

The monitoring system also includes force sensors measuring forces passing through at least two actuators of the actuation system. These force sensors make it possible to manage the case of skew of a movable surface due to damage to an actuator or of damaging of the movable surface. Indeed, these force sensors make it possible to detect the absence of force passing through one of the actuators of the actuation system and therefore to detect an abnormal situation or an excessive difference in force between the actuators of a same actuation system. Force sensors also have the benefit of being modular. Indeed, the threshold is electronically managed and is therefore easily configurable. So, with a same force sensor, it is possible to protect several types of actuator. Moreover, compared with mechanical torque limiters, force sensors offer the possibility to be tested regularly. It is therefore possible to check at any time that these force sensors have no anomaly. Finally, these sensors can be used for preventive maintenance. For example, it will be possible to monitor the course of the forces passing through the actuators during similar aircraft missions. If these forces vary significantly, it will be possible to anticipate maintenance operations to prevent seizure of the actuator and/or the movable surface, for example.

Further to the characteristics just discussed in the preceding paragraph, the monitoring system according to one aspect of the invention may have one or more additional characteristics from among the following, considered individually or according to any technically possible combinations:

the movable surface is a flap of an aeroplane wing or an aircraft leading edge slat or a spoiler.

the at least two position sensors are variable differential transducers or resolvers or potentiometers.

the at least two force sensors are strain gauges or extensometers or electromagnetic sensors.

the first and second actuators of the actuators of the actuation system are located at the ends of the movable surface.

A second aspect of the invention relates to a first monitoring method implemented by the monitoring system according to the invention, the first method comprising:

measuring the position of a first actuator and a second actuator among the actuators of the actuation system by the at least two position sensors of the monitoring system;

measuring the forces passing through the first actuator and the second actuator of the actuation system by the at least two force sensors of the monitoring system;

receiving, by the calculator, the positions measured by the at least two position sensors and the forces measured by the at least two force sensors;

calculating, by the calculator, the absolute value of a maximum difference between the positions measured by the at least two position sensors;

calculating, by the calculator, the absolute value of a maximum difference between the forces measured passing through the at least two force sensors; and detecting skew of the movable surface if:
the absolute value of the maximum difference between the positions measured by the at least two position sensors is greater than a threshold distance value difference; or
the absolute value of the maximum difference between the measured forces passing through the at least two force sensors is greater than a threshold force difference value.

Further to the characteristics just discussed in the preceding paragraph, the first method according to one aspect of the invention may have an additional step of stopping the actuation system of the movable surface when skew of the surface is detected.

A third aspect of the invention relates to a second monitoring method implemented by the monitoring system according to the invention, the second method comprising:

measuring the forces passing through the actuators by the at least two force sensors of the monitoring system;

receiving, by the calculator, the forces measured by the at least two force sensors;

determining, by the calculator, the maximum absolute value of a force passing through an actuator from the forces measured by the at least two force sensors; and detecting an excess force passing through the actuator among the actuators of the movable surface if the maximum absolute value of the force passing through the actuator among the forces measured by the at least two force sensors is greater than a threshold force value.

Further to the characteristics just discussed in the preceding paragraph, the second method according to an aspect of the invention may have an additional step of stopping the actuation system of the movable surface when an excess force passing through one of the actuators of the movable surface is detected.

A fourth aspect of the invention relates to an aircraft comprising the monitoring system according to the invention.

The invention and its different applications will be better understood upon reading the following description and upon examining the accompanying figures.

BRIEF DESCRIPTION OF THE FIGURES

The figures are set forth by way of indicating and in no way limiting purposes of the invention.

DETAILED DESCRIPTION

The figures are set forth by way of indicating and in no way limiting purposes of the invention.

Figure 1:
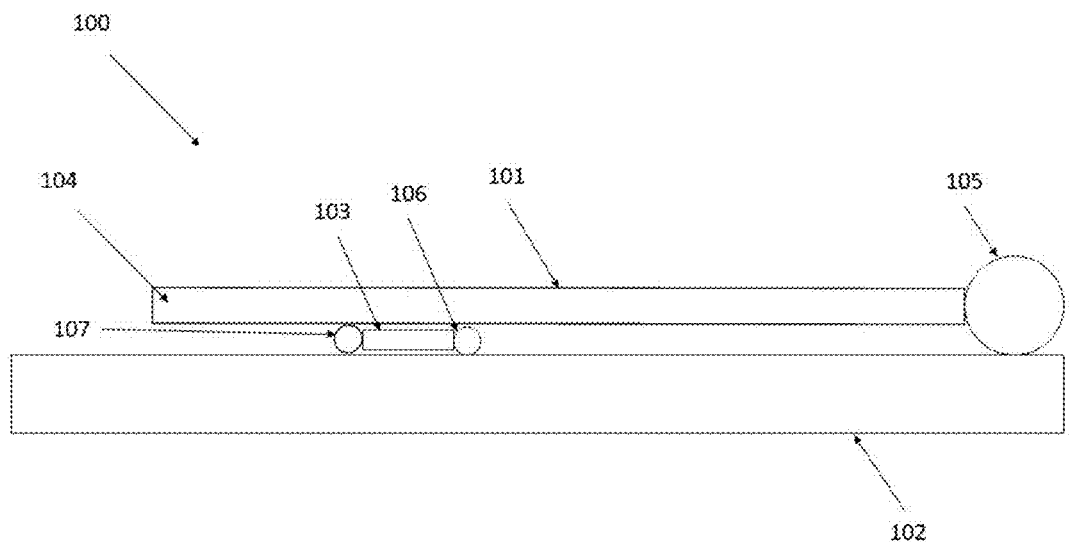
FIG. 1 and FIG. 2 show a schematic representation of a system 100 according to prior art comprising a movable surface, an actuator and a mechanical reference part.
Figure 2:
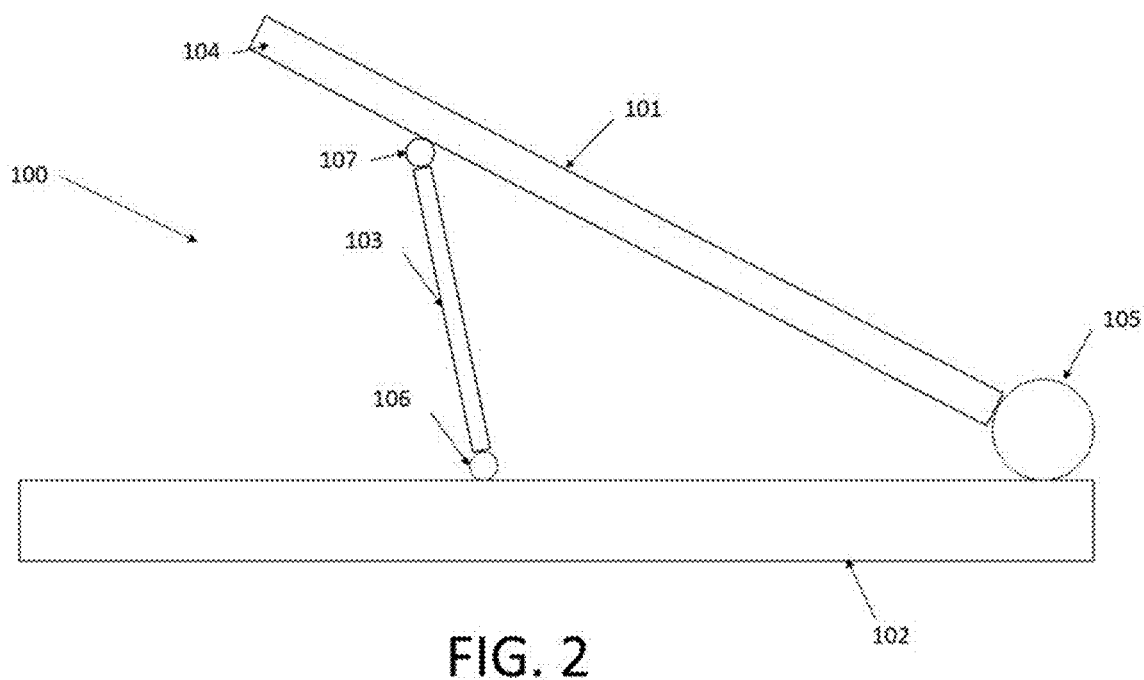
Figure 3:
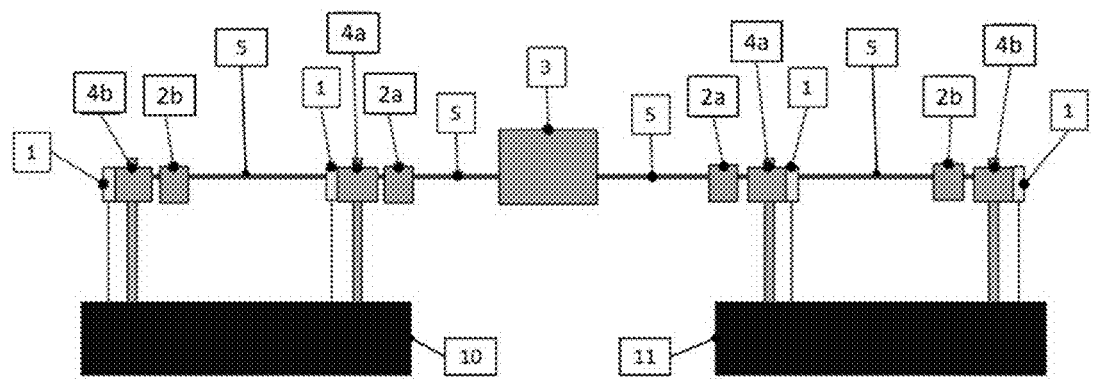
FIG. 3 shows a schematic representation of a system according to prior art comprising movable surfaces, an actuation system of the movable surfaces and a system for monitoring the movable surfaces.
Figure 4:
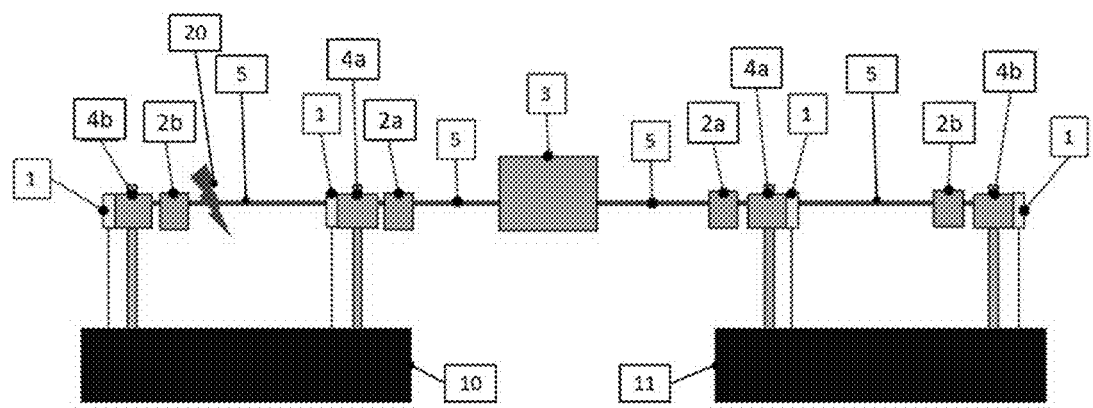
FIG. 4 and FIG. 5 show a schematic representation of damage to a system according to prior art comprising movable surfaces, an actuation system of the movable surfaces and a system for monitoring the movable surfaces.
Figure 5:
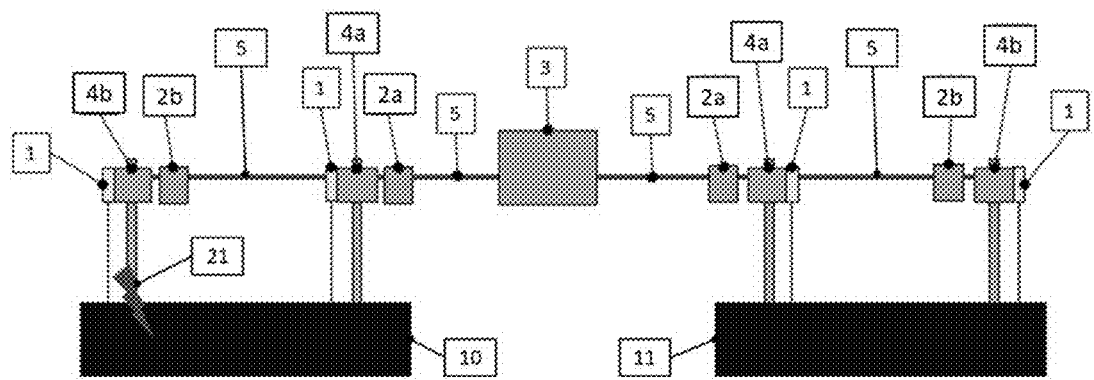
Figure 6:
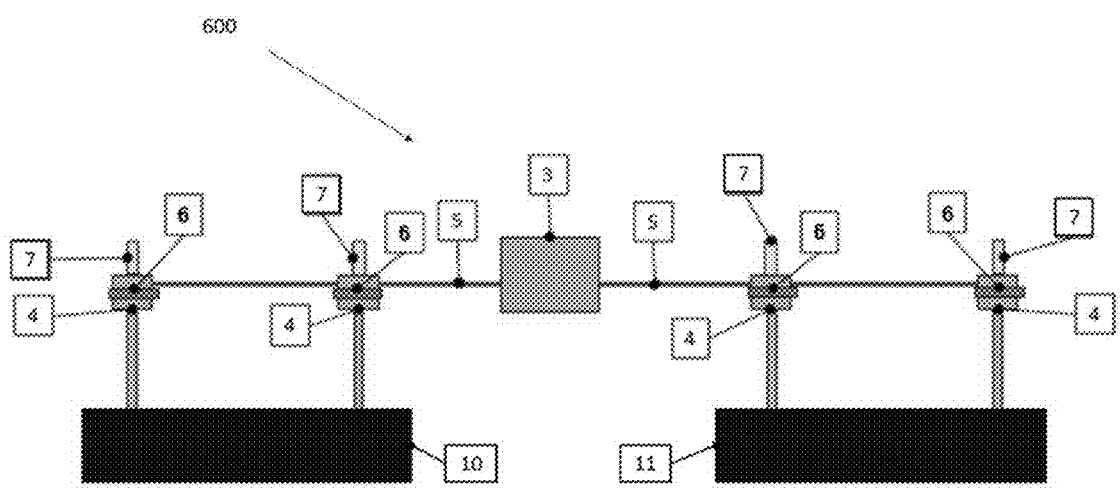
FIG. 6, FIG. 7 and FIG. 8 show different schematic representations of a monitoring system 600 according to an embodiment of the invention.

FIG. 6 shows a schematic representation of the monitoring system according to an embodiment of the invention.

The monitoring system 600 comprises a movable surface 10 or 11 of an aircraft, an actuation system comprising actuators 4, at least two position sensors 7 for each movable surface 10 and 11, at least two force sensors 6 for each movable surface 10 and 11 and a calculator. It should be noted that FIG. 6 also shows, for the sake of clarity, elements which are not included in the monitoring system 600 according to an aspect of the invention. For example, a power generator 3 and transmission elements 5 are shown in FIG. 6 but are not included in the monitoring system 600. The calculator or calculators of the monitoring system are not represented in the different figures. As will be appreciated, the one or more calculators can comprise one or more electronic circuitries that include at least one processor (e.g. a microprocessor) and a memory coded with instructions for carrying out, when the instructions are executed by the at least one processor, function(s) and/or operation(s) of the calculator(s).

In one alternative of the invention, the movable surface 10 or 11 is a tiltable surface such as, for example, a flap of an aeroplane wing or an aircraft leading edge slat or a spoiler.

The monitoring system according to an embodiment of the invention comprises at least two position sensors 7 for each movable surface 10 and 11. Each position sensor 7 makes it possible to measure the position of a distinct actuator 4 among the actuators of the actuation system of the movable surface. The position of an actuator is measured in millimetres, centimetres or metres. It may, for example, correspond to the distance between the ends of the actuator. The value of the position of an actuator makes it possible to calculate the position and/or tilt of the movable surface.

In an alternative of the invention, compatible with the preceding alternative, the position sensors 7 are variable differential transducers or resolvers or potentiometers.

When the actuation system of a movable surface 10 or 11 comprises two actuators 4, each actuator 4 will have its position measured by a different position sensor 7. For example, in FIG. 6, for the movable surface 10, the actuation system comprises two actuators 4. The monitoring system comprises two position sensors 7, each of the position sensors 7 being adapted to measure the position of a separate actuator 4.

When the actuation system of a movable surface comprises more than two actuators, two alternatives of the monitoring system according to an embodiment of the invention, compatible with the preceding alternatives, are possible.

Figure 7:
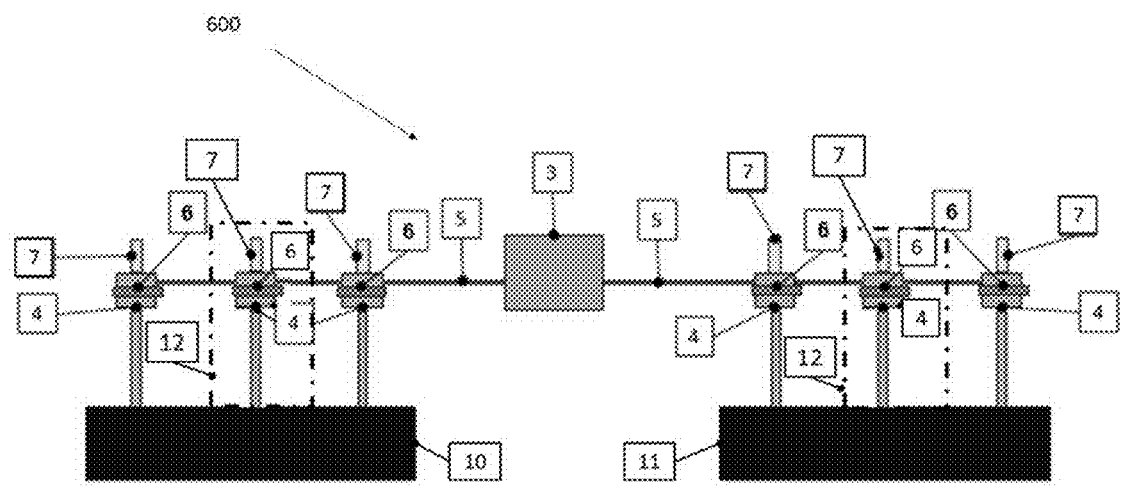

The first possible alternative consists in measuring the position of all the actuators. Thus there will be as many position sensors as actuators. FIG. 7 shows, for example, a monitoring system according to an embodiment of the invention comprising three actuators 4 and three position sensors 7 per movable surface 10 or 11.

The second possible alternative consists in measuring the position of only some of the actuators in the actuation system. In this way, there will be fewer position sensors than actuators. When this second implementation is chosen, it is desirable for the position sensors to measure the position of the actuators located at the ends of the movable surface. Thus, in FIG. 7, of the three actuators 4 in the actuation system of the movable surface 10 or 11, the position of the actuator 4 located between the other two actuators 4 would not be measured by a position sensor. For ease of understanding, a zone 12 delimited by dotted lines has been added for each movable surface 10 and 11. The actuator in the central position whose position is not measured is the one included in this zone 12. Thus, in this second implementation mode, one or more actuators of the actuation system do not have their position measured. This second implementation mode therefore requires fewer position sensors than actuators. It should be noted that this implementation mode does not preclude the position of one or more actuators, located between the actuators located at the ends of a movable surface, from being measured by a position sensor.

This second alternative ensures protection of the actuation system of a movable surface when a mechanical transmission element 5 is damaged since the skew of the movable surface will be detected using the position measurements of the at least two position sensors 7 which measure positions of the actuators 4 located at the ends of the movable surface 10 or 11.

The monitoring system according to an embodiment of the invention comprises at least two force sensors 6 per each movable surface 10 and 11. Each force sensor 6 makes it possible to measure the forces passing through a separate actuator 4 among the actuators of the actuation system of the movable surface. In an example, the actuators 4 whose forces are measured are identical to the actuators 4 whose position is measured by the position sensors 7. Thus, in this example, for a monitoring system comprising N position sensors 7 measuring the position of N actuators 4, the monitoring system will also comprise N force sensors 6 measuring the forces passing through these same N actuators 4. A monitoring system comprising more than two position sensors and more than two force sensors provides measurement redundancy.

In an alternative of the invention, compatible with the preceding alternatives, the force sensors 6 are strain gauges or extensometers or electro-magnetic sensors.

Finally, the monitoring system comprises a calculator. The calculator is an electronic system performing calculations on demand. The calculator is configured to detect skew of the movable surface and an excess force passing through the first and/or second actuator from the position obtained by the at least two position sensors and the force measured by the at least two force sensors. The calculator of a system for monitoring a movable surface is therefore connected to the position sensors and the force sensors of said monitoring system in order to be able to receive measurements made and optionally store them. The calculator is also adapted to stop the actuation system dedicated to said movable surface when skew of said movable surface and/or an excess force passing through the first and/or second actuator has been detected. This stopping of the actuation system ensures the integrity thereof.

Figure 8:
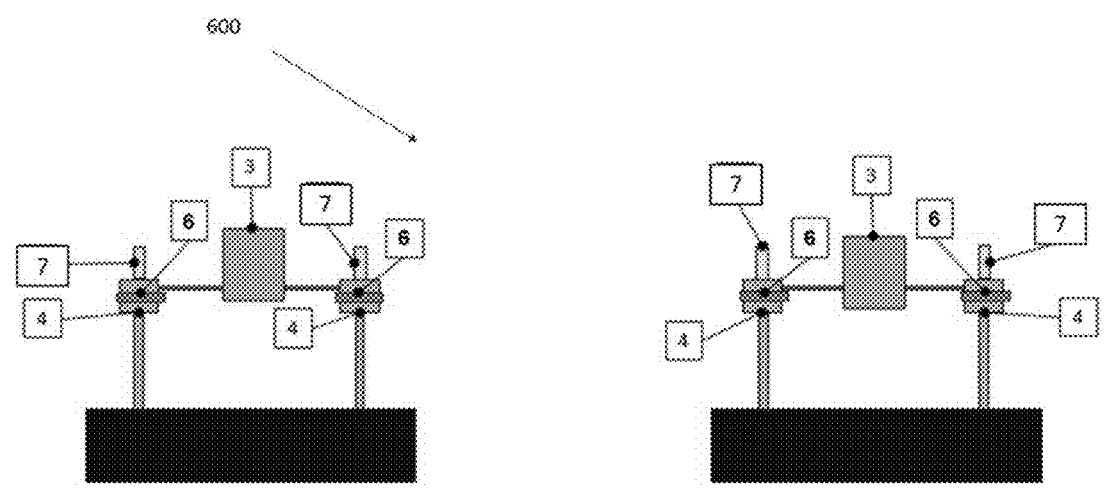

FIG. 8 is a schematic representation of the monitoring system 600 according to an embodiment of the invention when it is used on a so-called distributed architecture of a system with no mechanical link between the two movable surfaces 10 and 11. Alternatives of the monitoring system 600 are also compatible with these so-called distributed architectures.

Figure 9:
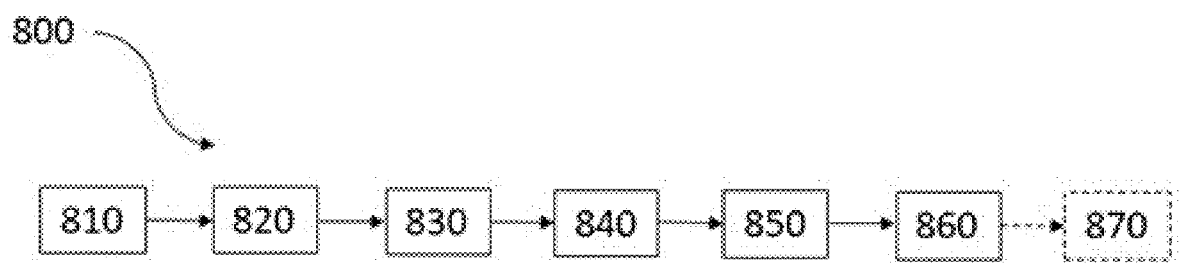
FIG. 9 shows a schematic representation of a first monitoring method 800 according to an embodiment of the invention.

An aspect of the invention also relates to a method 800 implemented by the monitoring system 600 according to an embodiment of the invention or by one of the alternatives of the monitoring system 600 according to an embodiment of the invention. FIG. 9 is a schematic representation of the method 800.

The method 800 comprises a first step of measuring 810 the position of a first actuator and a second actuator among the actuators of the actuation system by the at least two position sensors of the monitoring system. The position of an actuator is expressed in millimetres, centimetres or metres.

In an alternative to the method 800, the position of more than two actuators of a movable surface are measured in step 810. In a first example, the position of all actuators of a movable surface is measured in step 810. In a second example, only the position of some of all the actuators of a movable surface is measured in step 810. For this second example, it is desirable for at least the position of the actuators located at the ends of the movable surface to be measured, the measurement of the position of the other actuators being optional.

The method 800 comprises a second step of measuring 820 the forces passing through the first actuator and the second actuator among the actuators of the actuation system by the at least two force sensors of the monitoring system. A force is expressed in Newtons. The force sensors are therefore adapted to measure forces passing through the actuators whose position is being measured. Thus, if the position of an actuator is measured, forces passing through this same actuator are also measured.

The method 800 comprises a third step of receiving 830, by an adapted calculator, the positions measured by the at least two position sensors and the forces measured by the at least two force sensors. In this way, a calculator is dedicated to a single movable surface. For example, in FIG. 6 or FIG. 7 or FIG. 8, each movable surface 10 and 11 has a dedicated calculator.

The method 800 comprises a fourth step of calculating 840, by the calculator, the value of a maximum difference between the positions measured by the at least two position sensors. In this way, it is possible to make the difference between the position of the first actuator and the position of the second actuator. If the position of more than two actuators is measured, it is possible to identify beforehand the maximum position value of one actuator from all the position values measured and the minimum position value of one actuator from all the position values measured. Then the difference is calculated between the maximum position value and the minimum position value identified beforehand.

The method 800 comprises a fifth step of calculating 850 by the calculator, the value of a maximum difference between the measured forces passing through the at least two force sensors. Calculating 850 may, for example, consist in calculating the difference between the forces passing through the first actuator and the forces passing through the second actuator. If the forces for more than two actuators are measured, it is possible to identify beforehand the maximum value of the forces passing through an actuator from all the force values measured and the minimum value of the forces passing through an actuator from all the force values measured. Then the difference is calculated between the maximum value of forces and the minimum value of forces identified beforehand.

The method 800 comprises a sixth step of detecting 860 skew of the movable surface. Skew is detected if one of the following two conditions is met:
 the absolute value of the maximum difference between the positions measured by the at least two position sensors is greater than a threshold distance difference value.
 the absolute value of the maximum difference between the forces measured passing through the at least two force sensors is greater than a threshold force difference value.

The threshold distance and threshold force difference values are values which have been supplied to the calculator beforehand. These values may, for example, be determined by a user and depend, among other things, on the characteristics of the movable surface and of the aircraft. The threshold distance value is expressed in millimetres, centimetres or metres. The threshold force value is expressed in Newtons. The calculations in this step 860 may be performed by the calculator that performed the previous steps or by another calculator that will have received the results of the previous steps.

Optionally, the method 800 comprises a final step 870 of stopping the actuation system of the movable surface when skew of the surface is detected. This stopping, which may for example be decided by the calculator of the monitoring system, thus makes it possible to protect the actuation system when there is skew of the movable surface. This stopping consists, for example, in immobilizing the actuators or modifying the position of the movable surface in order to reduce forces passing through the actuators of the actuation system.

Figure 10:
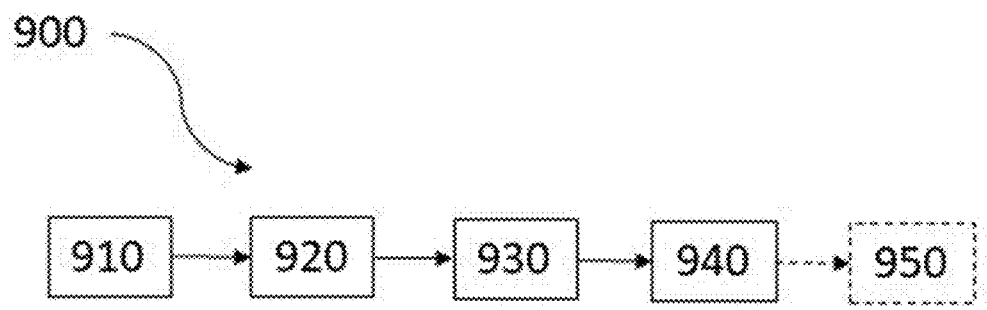
FIG. 10 shows a schematic representation of a second monitoring method 900 according to an embodiment of the invention.

An aspect of the invention also relates to a method 900 implemented by the monitoring system 600 according to an embodiment of the invention or by one of the alternatives of the monitoring system 600 according to an embodiment of the invention. FIG. 10 is a schematic representation of the method 900.

The method 900 comprises a first step of measuring 910 forces passing through the first actuator and in the second actuator among the actuators of the actuation system by the at least two force sensors of the monitoring system. A force is expressed in Newtons. The force sensors are therefore adapted to measure forces passing through the actuators.

The method 900 comprises a second step of receiving 920, by a calculator, the forces measured by the at least two force sensors. Thus, a calculator is dedicated to a single movable surface. For example, in FIG. 6 or FIG. 7 or FIG. 8, each movable surface 10 and 11 has a dedicated calculator.

The method 900 comprises a third step of determining 930, by the calculator, the maximum absolute value of a force passing through an actuator from among the forces measured by the at least two force sensors.

The method 900 comprises a fourth step of detecting 940 an excess force passing through an actuator among the actuators of the movable surface if the maximum absolute value of the force passing through the actuator among the forces measured by the at least two force sensors is greater than a threshold force value. This step therefore makes it possible to identify whether one or more of the actuators in the actuation system are subjected to excess force. The threshold force value is a value that has previously been supplied to the calculator. This value can be determined by a user and depends, among other things, on the characteristics of the movable surface and the aircraft. The threshold force value is expressed in Newtons. The calculations in this step may be performed by the calculator that performed the previous steps or by another calculator, which will have received the results of the previous steps.

Optionally, the method 900 comprises a final step of stopping 950 the actuation system of the movable surface when an excess force transiting through one of the actuators of the movable surface is detected. This stopping thus makes it possible to protect the actuation system. This stopping consists, for example, in immobilizing the actuators or modifying the position of the actuators in order to reduce the forces passing through the actuators of the actuation system.

The methods 800 and 900 may be performed jointly by the same monitoring system 600. In this case, steps 820 and 910 are merged to form a single step of measuring the forces passing through the actuators by the at least two force sensors of the monitoring system. In addition, steps 830 and 920 are merged into a step of receiving, by the calculator, the positions measured by the at least two position sensors and the forces measured by the at least two force sensors. Finally, the optional steps 870 and 950 can be merged into a step of stopping the actuation system of the movable surface when skew of the surface is detected or when an excess force passing through one of the actuators of the movable surface is detected.

Unless otherwise specified, a same element appearing in different figures has a single reference.

It will be appreciated that the various embodiments and aspects of the inventions described previously are combinable according to any technically permissible combinations.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The invention claimed is:
1. A monitoring system comprising:
 a movable surface of an aircraft;
 an actuation system for the movable surface of an aircraft comprising actuators; and at least two position sensors per movable surface of the aircraft, a first position sensor of the at least two position sensors being adapted to measure a position of a first actuator of the actuators and a second position sensor of the at least two position sensors being adapted to measure a position of a second actuator of the actuators;

at least two force sensors per movable surface of the aircraft, a first force sensor of the at least two force sensors being adapted to measure forces passing through the first actuator of the actuators, and a second force sensor of the at least two force sensors being adapted to measure forces passing through the second actuator of the actuators, and a calculator configured to detect skew of the movable surface and excess force passing through the first and/or second actuator from the position obtained by the at least two position sensors and the force measured by the at least two force sensors, wherein the calculator detects the skew of the movable surface if:

the absolute value of the maximum difference between the positions measured by the at least two position sensors is greater than a threshold distance value difference, or the absolute value of the maximum difference between the forces measured passing through the at least two force sensors is greater than a threshold force difference value, and wherein the actuation system stops the movable surface when skew of the surface is detected.

2. The monitoring system according to claim 1, wherein the movable surface is a flap of an aeroplane wing or a leading edge slat of an aircraft or a spoiler.

3. The monitoring system according to claim 1, wherein the at least two position sensors are variable differential transducers or resolvers or potentiometers.

4. The monitoring system according to claim 1, wherein the at least two force sensors are strain gauges or extensometers or electromagnetic sensors.

5. The monitoring system according to claim 1, wherein the first and second of the actuators of the actuation system are located at ends of the movable surface.

6. A monitoring method implemented by the monitoring system according to claim 1, the method comprising:

measuring the position of a first actuator and a second actuator among the actuators of the actuation system by the at least two position sensors of the monitoring system;

measuring the forces passing through the first actuator and the second actuator among the actuators of the actuation system by the at least two force sensors of the monitoring system;

receiving, by the calculator, the positions measured by the at least two position sensors and the forces measured by the at least two force sensors;

calculating, by the calculator, an absolute value of a maximum difference between the positions measured by the at least two position sensors;

calculating, by the calculator, an absolute value of a maximum difference between the measured forces passing through the at least two force sensors; and detecting skew of the movable surface if:

the absolute value of the maximum difference between the positions measured by the at least two position sensors is greater than a threshold distance value difference, or the absolute value of the maximum difference between the forces measured passing through the at least two force sensors is greater than a threshold force difference value, and stopping the actuation system of the movable surface when skew of the surface is detected.

7. A monitoring method implemented by the monitoring system according to claim 1, the method comprising:

measuring the forces passing through the actuators by the at least two force sensors of the monitoring system;

receiving, by the calculator, the forces measured by the at least two force sensors;

determining, by the calculator, a maximum absolute value of a force passing through an actuator from among the forces measured by the at least two force sensors, and detecting an excess force passing through the actuator among the actuators of the movable surface if the maximum absolute value of the force passing through the actuator among the forces measured by the at least two force sensors is greater than a threshold force value, and stopping the actuation system of the movable surface when an excess force passing through one of the actuators of the movable surface is detected.

8. An aircraft comprising a monitoring system that comprises:

a movable surface of an aircraft;

an actuation system for the movable surface of an aircraft comprising actuators; and at least two position sensors per movable surface of the aircraft, a first position sensor of the at least two position sensors being adapted to measure a position of a first actuator of the actuators and a second position sensor of the at least two position sensors being adapted to measure a position of a second actuator of the actuators;

at least two force sensors per movable surface of the aircraft, a first force sensor of the at least two force sensors being adapted to measure forces passing through the first actuator of the actuators, and a second force sensor of the at least two force sensors being adapted to measure forces passing through the second actuator of the actuators, and a calculator configured to detect skew of the movable surface and excess force passing through the first and/or second actuator from the position obtained by the at least two position sensors and the force measured by the at least two force sensors, wherein the calculator detects the skew of the movable surface if:

the absolute value of the maximum difference between the positions measured by the at least two position sensors is greater than a threshold distance value difference, or the absolute value of the maximum difference between the forces measured passing through the at least two force sensors is greater than a threshold force difference value, and wherein the actuation system stops the movable surface when skew of the surface is detected.

* * * * *